United States Patent [19]

Sell et al.

[11] Patent Number: 5,391,297

[45] Date of Patent: Feb. 21, 1995

[54] PROCESS FOR GAS TREATMENT AND DEGERMINATION AND APPARATUS FOR SIMULTANEOUSLY DEGERMINATING AND TREATING A LIQUID WITH GAS

[75] Inventors: Michael Sell, Peine; Andreas Mann, Hanover, both of Germany

[73] Assignee: Solvay Umweltchemie GmbH, Hanover, Germany

[21] Appl. No.: 79,906

[22] Filed: Jun. 23, 1993

[30] Foreign Application Priority Data

Jul. 2, 1992 [DE] Germany .................. 4221774

[51] Int. Cl.⁶ .............................. C02F 1/32
[52] U.S. Cl. ..................... 210/192; 210/209; 210/218; 210/748; 250/435
[58] Field of Search ........... 210/900, 760, 764, 763, 210/748, 192, 209, 218; 250/432 R, 435, 436; 422/24

[56] References Cited

U.S. PATENT DOCUMENTS

| | | | |
|---|---|---|---|
| 1,896,379 | 2/1933 | Ross | 250/432 |
| 4,141,830 | 2/1979 | Last | 210/748 |
| 4,189,363 | 2/1980 | Beitzel | 422/23 |
| 4,274,970 | 6/1981 | Beitzel | 210/748 |
| 4,956,754 | 9/1990 | Chen | 210/169 |
| 4,990,260 | 2/1991 | Pisani | 210/748 |
| 4,990,266 | 2/1991 | Vorlop et al. | 210/903 |
| 5,073,268 | 12/1991 | Saito et al. | 210/649 |
| 5,122,496 | 6/1992 | Vorlop et al. | |
| 5,234,584 | 8/1993 | Birbara et al. | 210/763 |

FOREIGN PATENT DOCUMENTS

| | | |
|---|---|---|
| 360941 | 4/1990 | European Pat. Off. . |
| 433893 | 6/1991 | European Pat. Off. . |
| 1049027 | 12/1953 | France ............ 250/432 |
| 2307877 | 9/1974 | Germany . |
| 3843679 | 7/1990 | Germany . |
| 3908516 | 9/1990 | Germany . |

OTHER PUBLICATIONS

Patent Abstracts of Japan, JP 59150589 and Derwent Abstract of JP 59150589, Dec., 1984.
Patent Abstracts of Japan, JP 3165889 and Derwent Abstract of JP 3165889, Oct., 1991.
Derwent Abstract of JP 61008189, Jan. 1986.
Derwent Abstract of JP 63166488, Jul., 1988.

*Primary Examiner*—Cynthia L. Nessler
*Attorney, Agent, or Firm*—Evenson, McKeown, Edwards & Lenahan

[57] ABSTRACT

A process for degerminating and treating aqueous liquids with gas having improved efficiency and an apparatus for simultaneously degerminating and gas treating liquids are described.

6 Claims, 2 Drawing Sheets

PROCESS FOR GAS TREATMENT AND DEGERMINATION AND APPARATUS FOR SIMULTANEOUSLY DEGERMINATING AND TREATING A LIQUID WITH GAS

BACKGROUND OF THE INVENTION

This invention relates to a process for the degermination of aqueous liquids to be subjected to a treatment with gas, using degerminating radiation, especially UV radiation.

Liquids, especially aqueous liquids, and in particular those from natural sources (e.g. ground water, spring water or river water) frequently contain germs, the presence or any multiplication of which is undesired for reasons of hygiene.

The required degermination can be undertaken by the addition of chemical agents, e.g. hydrazine, chlorine or chlorine dioxide. The use of such agents does not enter into consideration on health grounds in many cases, on account of their toxicity and the possible formation of chlorinated compounds.

Another method for degermination is represented by degerminating irradiation, especially with UV light. U.S. Pat. No. 5,122,496 discloses a process for catalytic removal of the nitrite and/or nitrate content in water in which this type of degermination is employed.

In this process, especially ground water, river water and spring water are to be pretreated by removal of the nitrite or nitrate which is usually contained therein. In this case, the water to be treated is initially passed, for degermination, through a container in which it is irradiated with UV light. Thereafter, it is treated with hydrogen gas and the water treated with gas is passed over a catalyst containing a metal of the platinum group; in this case, nitrite or nitrate is broken down by reaction with the hydrogen dissolved in the water, into nitrogen and water.

In spite of the degerminating treatment carried out prior to treatment with gas, an increasing contamination of the apparatuses and of the catalyst system with germs was observed.

SUMMARY OF THE INVENTION

The object of the present invention is to provide a process which overcomes the disadvantages of the known process.

These and other objects are achieved by providing a process for treating a liquid comprising the steps of exposing the liquid to an effective degerminating amount of degerminating radiation and contacting the liquid with a gas, wherein the exposure to degerminating radiation is effected simultaneously with or subsequent to the gas contact.

In accordance with a further aspect of the invention, the objects are also achieved by providing an apparatus for simultaneously treating a liquid with a gas and with degerminating irradiation, the apparatus comprising a closeable container for receiving the liquid, the container having an inlet and outlet for the liquid, an inlet for introducing a treatment gas into contact with the liquid in the container, and at least one source of degerminating radiation for exposing liquid in the container to degerminating radiation.

DETAILED DESCRIPTION OF PREFERRED EMBODIMENTS

The process according to the invention for the degermination of aqueous liquids to be subjected to a treatment with gas, using degerminating radiation, especially UV radiation, is characterized in that the degerminating irradiation is carried out after the treatment with gas or in that treatment with gas and degerminating irradiation are carried out simultaneously.

The process according to the invention can be carried out using any desired degerminating radiation. Particular preference is given to the use of UV radiation. It is possible, for example, to use low-pressure mercury radiators or high-pressure mercury radiators. Such radiators having a radiative emission in the wavelength range of 180 to 300 nm are particularly effective.

According to a preferred embodiment, treatment with gas and degerminating irradiation is carried out simultaneously. This is particularly advantageous from the technical point of view, since it can be carried out in a time saving and space saving manner.

The process according to the invention can be used within the context of various gas treatment processes, for example in the gas treatment of water with ozone for the purpose of sterilization, in the mixing of waters with carbon dioxide or in the gas treatment of aqueous liquids with hydrogen. The gas treatment of aqueous liquids with hydrogen can serve various purposes. On the one hand, it is possible to perform the catalytic removal of oxygen by reaction with the dissolved hydrogen. The low-oxygen or oxygen-free waters can be used for the purposes of the foodstuffs industry. Low-oxygen or oxygen-free aqueous liquids are also, on account of their reduced corrosiveness, usable with great advantage as process liquids, for example cooling liquids in industrial apparatuses.

Furthermore, it is also possible to eliminate undesired reducible components, such as nitrite and/or nitrate, in the presence of hydrogen in the aqueous liquid. This can take place by biological processes. The process according to the invention then prevents the contamination of the employed bacterial flora by undesired extraneous germs.

The removal of nitrite and/or nitrate can also be accomplished by catalytic processes. The process according to the invention effectively prevents the contamination of apparatuses and catalysts with germs.

The following text contains a description of an apparatus which likewise forms part of the invention and is suitable for the simultaneous treatment with gas and degermination of aqueous liquids. This apparatus comprises a container for receiving the liquid, inlet and outlet for the liquid, inlet and possibly outlet for the gas, as well as one or more radiation sources having a degerminating action, preferably one or more UV light sources.

In the case of gases having good solubility of the aqueous liquid to be treated with gas, it may be sufficient to allow the gas to bubble through the liquid. It is of advantage to provide in the device means by which the gas can be contacted in a fine distribution with the aqueous liquid. By way of example, it is possible to pass the liquid to be treated with gas, such as ground water, spring water or river water, together with the gas, for example hydrogen, via a nozzle plate and in this manner to achieve good dissolving of the gas in the liquid. In this case, a gas cushion is built up, through which the water passes and thus becomes enriched or saturated with the gas.

It is advantageous to provide containers with a radiation-reflecting, preferably polished or mirrored internal surface, since the radiation source can then be utilized particularly well.

Container shapes which permit a longer irradiation, for example containers which are elongate in the direction of flow of the liquid, with radiation sources which are likewise advantageously elongated in the direction of flow, are preferred. One or more bar-shaped UV light sources which are disposed in the direction of flow in an elongate container are very advantageous. Where only one light source is provided, this is advantageously positioned so as to be centered (central) in the container along the longitudinal axis. If desired, two bar-shaped UV lamps can also be disposed in the container in succession longitudinally in relation to the direction of flow. This has the advantage that it is possible in a controlled manner to irradiate independently of one another the liquid phase and a foam/gas phase which may possibly be formed.

Desirably, the level of the phase interface between the liquid phase and the foam/gas phase is regulated. This may be effected, for example, by means of floating contacts or ultrasonic sources.

BRIEF DESCRIPTION OF THE DRAWING

The process of the invention is explained in further detail with reference to the accompanying drawings in which.

DESCRIPTION OF ILLUSTRATIVE EMBODIMENTS

Figure 1:
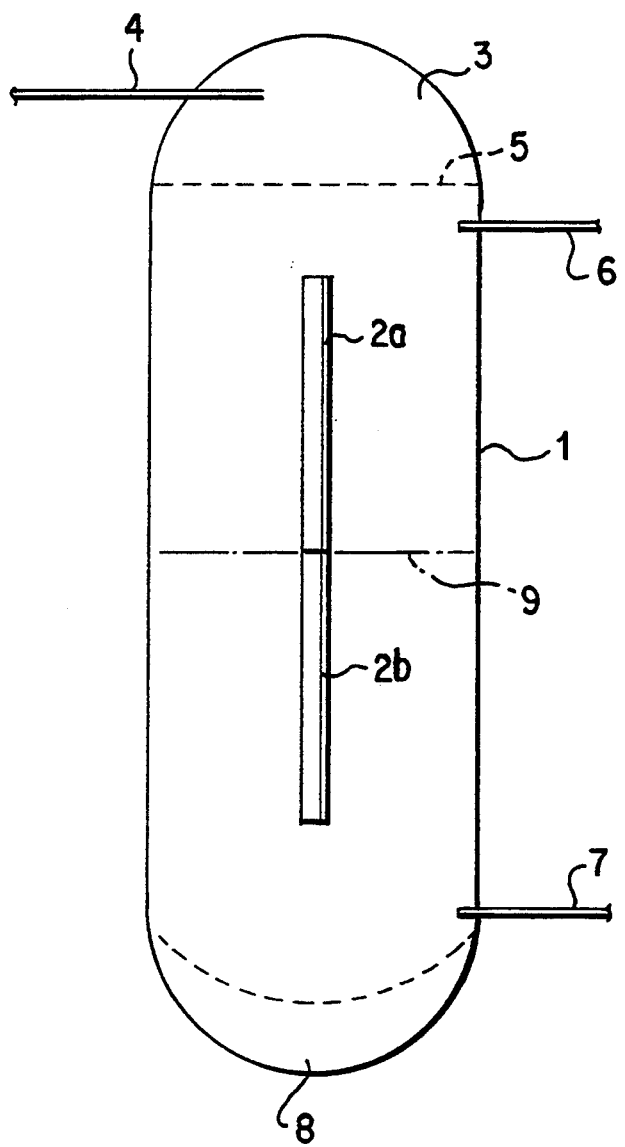
FIG. 1 is a schematic representation of an illustrative preferred embodiment of an apparatus for carrying out the process of the invention.

The apparatus comprises an elongated container 1 of compression-resistant material. The container may be formed of any suitable material, such as, for example, stainless steel. Two bar-shaped UV radiators 2a and 2b are disposed in succession along the central axis of the container 1. A container head 3, which can be connected to the container 1 in a pressure tight manner, exhibits a supply line 4 for the aqueous liquid. A sieve tray 5 is disposed between the container head 3 and container 1. Directly below the sieve tray 5 there is a gas feed line 6. The liquid which has been treated with gas can be let out from the container through an outlet 7. The closing of the container 1 is accomplished by a container bottom 8 disposed below the outlet 7. Conventional devices such as pressure relief valves which protect the container against explosion and/or devices for regulating the liquid-foam/gas phase interface as well as power cables for the radiators are not shown.

The process is further described with reference to a specific embodiment, namely the nitrate reduction of well water. The well water to be treated with gas is introduced under a feed pressure through the line 4 into the container. Hydrogen is introduced via a line 6. In the course of the mixing with the water, a hydrogen gas cushion is formed in the container. The water passed into the container is sprayed via a nozzle plate or sieve tray 5 and passes, in a finely distributed condition, into the gas space in the interior of the container. In this case, the water becomes saturated with hydrogen. Below the gas/liquid phase interface there is an aqueous phase which contains hydrogen or is saturated with hydrogen. The quantity of water fed in or conducted away is controlled so that the liquid-foam/gas phase interface is approximately at the height of the point of connection of the two UV radiators 2a and 2b which are employed, i.e. corresponds approximately to the line 9 shown in FIG. 1. The two UV radiators can be switched on and off respectively independently of one another. They are cooled by the water flowing past them.

The ground water which is treated with hydrogen gas and which is preferably saturated was then passed through a catalyst bed, in which, in accordance with the teaching of U.S. Pat. No. 5,122,496, the entire disclosure of which is incorporated herein by reference, nitrite and nitrate could be removed by reaction with hydrogen to form nitrogen and water.

Metal catalysts formed from a porous carrier material impregnated with the metal component are used for the process of the invention. Palladium and/or rhodium are used as metal components if only nitrite is to be removed from the water. If the water also contains nitrate, palladium in combination with a metal of the copper group or also rhodium is used. Copper and silver are particularly suitable as metals of the copper group. Preferably, copper is used.

The proportion of the metal component in the total catalyst may be between 0.1 and 10% weight, preferably between 1 and 10, in particular between 2 and 8% weight.

A palladium content of 1 to 5% weight, in particular 2 to 5% weight, relative to the overall weight of the catalyst has proved advantageous.

Preferably a combination of palladium with copper is used as the metal component of the catalyst. This combination has proved advantageous both in its activity in the hydrogenation of nitrite and nitrate and it its selectivity (selective hydrogenation to molecular nitrogen). The weight ratio of palladium to copper may be from 2:1 to 8:1, in particular from 3:1 to 5:1, and is preferably 4:1.

A mixture of catalyst particles containing solely palladium as the metal component and catalyst particles containing palladium and a metal of the copper group, in particular copper, as metal components may also be advantageously used to treat nitrate-polluted or nitrate- and nitrite-polluted water. The weight ratio of Pd-containing to Pd/Cu-containing catalyst particles may vary depending on the nitrate and nitrite content of the water and the quantity and composition of the metal components of the catalysts, and may be between 1:5 and 5:1, preferably between 1:2 and 2:1.

In addition to nitrite and/or nitrate, the dissolved oxygen in the polluted water is also decreased under the conditions of the process of the invention. In order to remove the nitrite and/or nitrate content of the water completely, therefore, a total quantity of hydrogen gas is required which at least corresponds to the stoichiometrically required amount for reduction of the oxygen content and the nitrite and/or nitrate content of the water. For instance, in theory about 9 mg hydrogen are required for the reduction of 100 mg nitrate. If the water to be treated only contains small quantities of nitrite and/or nitrate, it is advantageous to add a quantity of hydrogen which corresponds at least to the stoichiometrically calculated quantity and at most to a 20% excess of this calculated quantity.

Figure 2:
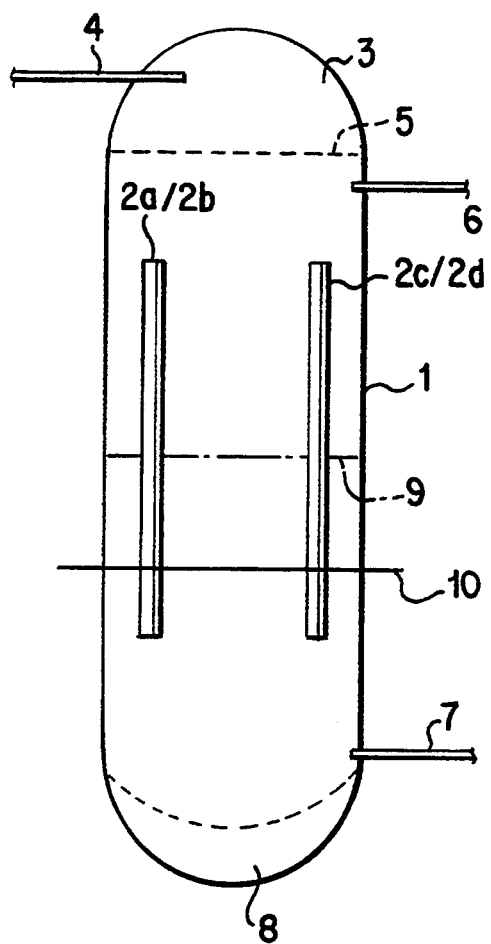
FIG. 2 is a schematic side elevational view of an alternate apparatus for carrying out the invention.
Figure 2A:
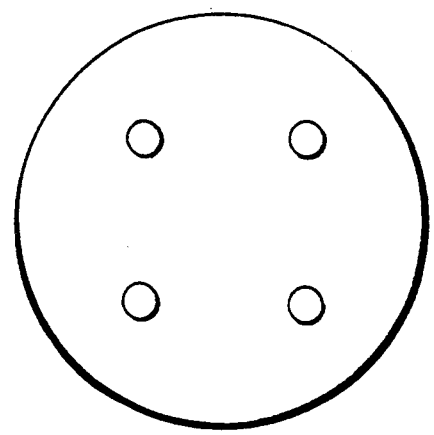
FIG. 2a is a cross-sectional view taken along the surface 10 of the apparatus of FIG. 2.

An alternative embodiment of the device exhibits a plurality, e.g. 4, radiation sources, which are disposed side by side along the direction of flow. FIG. 2 shows a side elevation, and FIG. 2a a cross-section along the surface 10. The reference symbols 2a, 2b, 2c and 2d identify four bar-shaped UV radiators.

The above examples of application processes or devices are not intended to restrict the invention. Modifications, for example variations of the container, of the radiation source of the liquid to be treated with gas or of the gas employed are within the discretion of the person skilled in the art. By way of example, the process can also be used for the treatment of water with ozone gas for the purpose of sterilization or decomposition of contaminating substances, for example of hydrocarbons, for the treatment of water with oxygen gas with the objective of enrichment with oxygen or the oxidative breakdown of contaminating materials, or other oxidative or reducing processes within the preprocessing of water or purification of waste. A further area of application resides in treatment with inert gases such as, for example, nitrogen, in order to drive out other undesired gases dissolved in the aqueous liquid.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for simultaneously treating a liquid with a gas and with degerminating irradiation, said apparatus comprising a closeable container for receiving said liquid, said container having an inlet for introducing the liquid into the container and an outlet for discharging the liquid from the container whereby the liquid flows through said container in a predetermined direction, an inlet for introducing a treatment gas into contact with said liquid in said container, a gas distributor means for distributing the treatment gas in the liquid to produce a gas phase or a foam phase which forms an interface with the liquid, a UV light source comprising two bar-shaped UV radiators disposed in succession along said predetermined direction of liquid flow for exposing liquid in said container to degerminating radiation, and means for controlling the introduction of liquid through said inlet and the discharge of liquid through said outlet and for maintaining said interface substantially at a level between said two successive UV radiators.

2. An apparatus according to claim 1, further comprising a gas outlet for exhausting treatment gas from said container.

3. An apparatus according to claims 1, wherein said container has an internal surface which reflects said degerminating radiation.

4. An apparatus according to claim 3, wherein said internal surface is a polished surface.

5. An apparatus according to claim 3, wherein said internal surface is a mirrored surface.

6. An apparatus according to claim 1, wherein said liquid flows axially through said container and said UV light source is disposed centrally in the container extending along the direction of flow.

* * * * *